(12) United States Patent
Christodoulides et al.

(10) Patent No.: US 8,101,929 B1
(45) Date of Patent: Jan. 24, 2012

(54) DIFFRACTION FREE, SELF-BENDING AIRY WAVE ARRANGEMENT

(75) Inventors: Demetrios N. Christodoulides, Casselberry, FL (US); Aristide Dogariu, Winter Springs, FL (US); Georgios Siviloglou, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 465 days.

(21) Appl. No.: 12/427,842

(22) Filed: Apr. 22, 2009

Related U.S. Application Data

(60) Provisional application No. 61/047,512, filed on Apr. 24, 2008.

(51) Int. Cl.
*G02B 27/56* (2006.01)
*H05H 3/04* (2006.01)
*G21K 1/06* (2006.01)

(52) U.S. Cl. ............ 250/493.1; 359/559; 181/142; 181/139; 372/29.02; 356/337

(58) Field of Classification Search .......... 250/493.1; 359/559; 356/337; 372/29.02; 181/142, 181/139
See application file for complete search history.

(56) References Cited

U.S. PATENT DOCUMENTS

| | | | |
|---|---|---|---|
| 4,852,973 A * | 8/1989 | Durnin et al. ............... | 359/559 |
| 4,887,885 A * | 12/1989 | Durnin et al. ............... | 359/559 |
| 4,975,237 A * | 12/1990 | Watling ............... | 356/338 |
| 5,748,371 A | 5/1998 | Cathey, Jr. et al. | |
| 6,536,898 B1 | 3/2003 | Cathey, Jr. | |
| 6,552,864 B1 | 4/2003 | Ruschin | |
| 6,719,204 B2 | 4/2004 | Li | |
| 6,884,962 B2 * | 4/2005 | Lizotte ............... | 219/121.73 |
| 7,218,448 B1 | 5/2007 | Cathey, Jr. et al. | |

OTHER PUBLICATIONS

Siviloglou, G.A., Broky, J., Dogariu, A., Christodoulides, D.N., Ballistic Dynamics of Airy Beams, Optics Letters, 2008, pp. 207-209, vol. 33, No. 3.
Siviloglou, G.A., Christodoulides, D.N., Accelerating Finite Energy Airy Beams, Optics Letters, 2007, pp. 979-981, vol. 32, No. 8.
Siviloglou, G.A., Broky, J., Dogariu, A., Christodoulides, D.N., Observation of Accelerating Airy Beams, Physical Review Letters, 2007, pp. 213901-1-213901-4, vol. 99.
Clerici, M., Faccio, D., Lotti, A., Rubino, E., Jedrkiewicz, O., Biegert, J., Di Trapani, P., Finite-Energy, Accelerating Bessel Pulses, Optics Express, 2008, pp. 19807-19811, vol. 16, No. 24.

(Continued)

*Primary Examiner* — Nikita Wells
(74) *Attorney, Agent, or Firm* — Brian S. Steinberger; Phyllis K. Wood; Law Offices of Brian S. Steinberger, P.A.

(57) ABSTRACT

Methods and systems for Airy waves and Airy wavepackets or Airy beam generation from an input beam or pulse. Airy wavefronts and Airy wavepackets can be generated using Airy beam generation through Fourier synthesis using phase masks or filters in the spatial domain; Airy beam generation using amplitude and phase filters in the spatial domain; and Airy pulse generation through Fourier synthesis using phase and/or amplitude filters in the temporal frequency domain. The Airy waves are highly asymmetric and as a result their energy is more tightly confined in one quadrant thus increasing the energy density in the main lobes. These wavepackets can be one, two, and three-dimensional waves. In addition they tend to self-heal themselves which is important in adverse environments.

18 Claims, 13 Drawing Sheets

OTHER PUBLICATIONS

Ando, T., Ohtake, Y., Matsumoto, N., Inoue, T., Fukuchi, N., Mode Purities of Laguerre-Gaussian Beams Generated via Complex-Amplitude Modulation Using Phase-Only Spatial Light Modulators, Optics Letters, 2009, pp. 34-36, vol. 34, No. 1.

Irvine, W., Bouwmeester, D., Linked and Knotted Beams of Lights, Nature Physics, 2008, pp. 716-720, vol. 4.

Bandres, M., Accelerating Parabolic Beams, Optics Letters, 2008, pp. 1678-1680, vol. 33, No. 15.

Dholakia, K., Against the Spread of Light, Nature Optics, 2008, pp. 413, vol. 451, No. 24.

Bandres, M., Gutierrez-Vega, J., Airy-Gauss Beams and Their Transformation by Paraxial Optical Systems, Optics Express, 2007, vol. 15, No. 25, abstract.

Zyga, L., Scientists Make First Observation of Airy Optical Beams, 2007, http://www.physorg.com/news115556629.html, retrieved on Apr. 9, 2009.

Choi, C., New Trick of Light Bends Beams, 2007, http://www.msnbc.msn.com/id/22360801, retrieved on Apr. 9, 2009.

Reucroft, S., Swain, J., Scientists Find Light Doesn't Always Travel in Straight Lines, 2008, http://cerncourier.com/cws/article/cern132506, retrieved on Apr. 9, 2009.

Choi, C., Researched Use LCD Screen to Bend Light, 2007, http://view.atdmt.com/CNT/iview/144025723/direct; wi.300;hi.240/01/8033832?click=http://..., retrieved on Apr. 9, 2009.

* cited by examiner

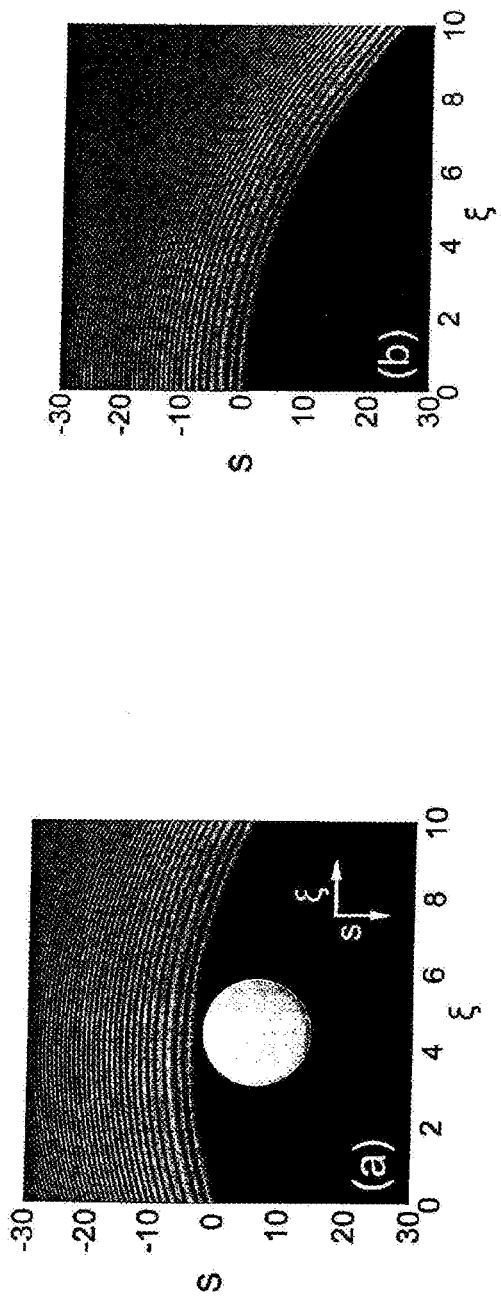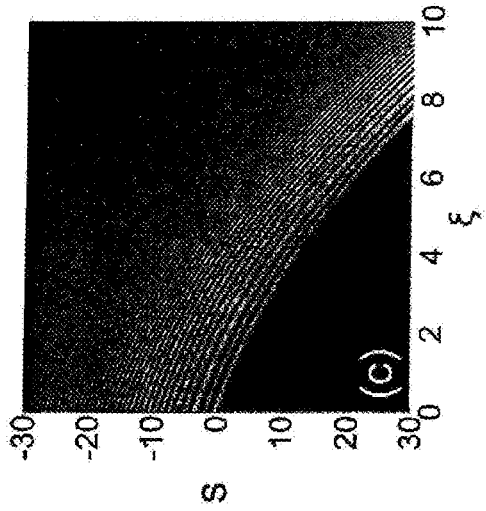
Fig. 2a
Fig. 2b
Fig. 2c

DIFFRACTION FREE, SELF-BENDING AIRY WAVE ARRANGEMENT

This application claims the benefit of priority to U.S. Provisional Application No. 61/047,512 filed on Apr. 24, 2008.

FIELD OF THE INVENTION

This invention relates to wave transmission and, in particular, to methods, apparatus and systems for generating diffraction free Airy waves and wavepackets that propagate over relatively long distances without any appreciable broadening and or spreading-effects for application including optics, acoustics, microwaves, in particle manipulation and detection, biology, cold atom optics, and in material processing.

BACKGROUND AND PRIOR ART

Diffraction-free beams are by definition localized optical wave packets that remain invariant during propagation. Perhaps the best known example of such a diffraction-free wave is the Bessel beam first predicted theoretically and experimentally demonstrated by Durnin, J. J. Opt Soc. Am. A 4, p. 651 (1987) and Durnin, et al. Phys. Rev. Lett. 58, p. 1499 (1987). Other such non-diffracting wave configurations include, for example, higher-order counterparts, as well as waves based on parabolic cylinder functions as described in J. C. Gutierrez-Vega, et al., Opt. Lett. 25, p. 1793 (2000) and M. A. Bandres, et al. Opt. Lett. 29, p. 44 (2004). In systems that exhibit bidiffraction, normal diffraction in one direction and anomalous in the other, such as photonic crystals and lattices, nondiffracting X-waves and Bessel-like beams are also possible as discussed in J. Lu and J. F. Greenleaf, IEEE Trans. Ultrason. Ferroelectr. Freq. Control 39, p. 19 (1992) and in D. N. Christodoulides et al., Opt. Lett. 29, p. 1446 (2004) and O. Manela et al., Opt. Lett. 30, p. 2611 (2005). Strictly speaking, these solutions convey infinite power, and for this very reason they are "impervious" to diffraction.

If, on the other hand, these diffraction-free beams pass through a finite aperture (are truncated), diffraction eventually takes place. Yet, in such cases, the rate of diffraction can be considerably slowed down depending on the degree of truncation, i.e., how large is the limiting amplitude aperture with respect to the features of the beam. In the case of finite Bessel beams, such effects were first theoretically analyzed by Gori, et al., Opt. Commun. 64, p. 491 (1987).

An important aspect associated with such diffraction/dispersion-free wave packets is their dimensionality. In fact all the above-mentioned solutions exist only in (2+1)D and (3+1)D configurations. The problem becomes more involved in the lowest dimension [e.g., in (1+1)D], which is known to describe the diffraction of planar optical beams or pulse propagation in dispersive optical fibers. Yet, even in this case, dispersion-free Airy wave packets are possible, as first predicted by Berry and Balazs within the context of quantum mechanics. This interesting class of Airy structures is unique in the sense that these beams lack parity symmetry and tend to accelerate during propagation. The acceleration process associated with these beams was later interpreted by Greenberger, Am. J. Phys. 48, p. 256 (1980) on the basis of the equivalence principle. In this latter case with Airy wave packet again associated with an infinite energy. In addition by its very nature, the Airy beam is "weakly confined," since its oscillating tail decays very slowly. Therefore, for all practical purposed, it is difficult to synthesize such beams unless of course they are amplitude truncated. Finite energy (exponentially decaying) diffractionless Airy planar beams in nonlinear unbiased photorefractive crystals have been predicted as a result of thermal diffusion. Yet, finite power Airy wave packets have never been investigated under linear conditions.

In 1979 M. V. Berry and N. L. Balazs, Am. J. Phys. 47, 264 (1979) made an important observation within the context of quantum mechanics: they theoretically demonstrated that the Schrodinger equation describing a free particle can exhibit a nonspreading Airy wave packet solution. Perhaps the most remarkable feature of this Airy packet is its ability to freely accelerate even in the absence of any external potential. In one dimension, this Airy packet happens to be unique, e.g., it is the only nontrivial solution, apart from a plane wave, that remains invariant with time.

Siviloglou, G, and Christodoulides, D., "Accelerating finite energy Airy beams, Optics Letters, Vol. 32, No. 8, Apr. 15, 2007, pp. 979-981 discusses properties of Airy beams and the investigation of the acceleration dynamics of quasi-diffraction-free finite energy Airy beams and concludes that freely accelerating finite energy Airy beams are possible in both one- and two-dimensional configurations. However, the publication does not teach, and thus is not enabling in regard to methods or systems for implementing Airy wave packets in dispersive optical fibers.

Over the years, nonspreading or nondiffracting wave configurations have been systematically investigated in higher dimensions (two and three dimension), particularly in the areas of optics and atom physics. What makes the analogy between these two seemingly different disciplines possible is the mathematical correspondence between the quantum mechanical Schrodinger equation and the paraxial equation of diffraction. In terms of experimental realization, optics has thus far provided a fertile ground in which the properties of such nonspreading localized waves can be directly observed and studied in detail. Perhaps the best known example of such a two dimensional diffraction-free optical wave is the so-called Bessel beam first suggested and observed and studied in detail. Perhaps the best known example of such a 2D diffraction-free optical wave is the so-called Bessel beam first suggested and observed by Durnin, et al.

Even though at first sight, the aforementioned propagation-invariant beams may appear dissimilar, they in fact share common characteristics. First, they are all generated from an appropriate conical superposition of plane waves. Even more importantly, all these solutions are known to convey infinite power, a direct outcome of their nondiffracting nature. Of course, in practice, all these nonspreading beams are normally truncated by an aperture because of lack of space and power, thus as a result they tend to diffract during propagation. Yet, if the geometrical size of the limiting aperture greatly exceeds the spatial features of the ideal propagation-invariant fields, the diffraction process is considerably "slowed down" over the intended propagation distance and hence for all practical purposes these beams are called "diffraction-free". No localized one-dimensional propagation-invariant beam can be synthesized through conical superposition.

Quite recently, nonspreading freely accelerating Airy beams have been realized within the context of optics G. A. Siviloglou, et al. Phys. Rev. Lett. 99, p. 213901 (2007). This observation was carried out by exploiting the formal analogy between the free-particle Schrodinger equation and the paraxial equation of diffraction, validating an earlier theoretical prediction by Berry and Balazs, Am. J. Phys. 47, 264, (1979). Perhaps the most intriguing characteristic of the Airy wavepacket is its ability accelerate even in the absence of any external potential discussed in Berry and Balazs and Greenberger, Am. J. Phys. 48, 256 (1980). In fact, in one-dimensional settings the Airy wave happens to be unique. It is important to note that like any other diffraction-free beam, the Airy wave carries infinite power and hence its realization demands some degree of truncation.

In two recent studies, the dynamics of exponentially truncated (finite energy) Airy beams have been explored in Berry and Balazs (1979) and in Siviloglou (2007). In these works it was demonstrated that finite energy Airy beams can still resist diffraction, while their main intensity maxima or lobes tend to accelerate during propagation along parabolic trajectories. The aforementioned acceleration occurs in spite of the fact that center of gravity of these truncated waves remains invariant in accord with Ehrenfest's theorem. This behavior can persist over long distances until diffraction effects eventually take over as described in Siviloglou (2007). Overall these unusual properties of the Airy wavepackets put them in a category by themselves. Unlike other families of nondiffracting fields described in Durnin (1987); Gutierrez-Vega (2000) and Bandres (2004), Airy beams are also possible in one dimension, do not result from conical superposition, and are thus highly assymetric.

In Siviloglou, G, Broky, J., Dogariu, A. and Christodoulides, D., "Observations of Accellerating Airy Beams", Physical Review Letters, 99, 213901, Nov. 20, 2007, the observations of one- and two-dimensional accelerating diffraction-free Airy beams are disclosed. The observations include that even though Airy beams are exponentially truncated (convey finite power) they still resist diffraction while their main intensity maxima or lobes tend to accelerate during propagation along parabolic trajectories. The publication suggests using a phase mask to generate one- and two-dimensional Airy beams for observing the intensity profile of the Airy beam. The publication concludes that Airy optical wave packets were observed and that they exhibit unusual features such as the ability to remain diffraction free over long distances while they tend to freely accelerate during propagation. Like Siviloglou (Mar. 19, 2007) the publication discloses observations, it fails to provide enabling method or systems for implementing Airy wave packets or applications for using the Airy wave packets.

Thus, what is needed are methods and systems for generating Airy waves and to synthesize such Airy wavepackets in both the spatial and temporal domain.

SUMMARY OF THE INVENTION

A primary objective of the invention is to provide apparatus, methods, systems and devices for generating diffraction free Airy waves and wavepackets that propagate over relatively long distances without any appreciable broadening and or spreading-effects.

A secondary objective of the invention is to provide methods, apparatus and systems for the Airy packet or beam having all the advantages of a diffraction-free or dispersion free wave but at the same time, its intensity features accelerate or self-bend during propagation.

A third objective of the invention is to provide methods, apparatus and systems for Airy waves and wavepackets that perform ballistic dynamics akin to projectiles moving under the action of gravity.

A fourth objective of the invention is to provide methods, apparatus and systems for Airy waves are highly asymmetric and as a result their energy is more tightly confined in one quadrant thus increasing the energy density in the main lobe(s). Importantly these wavepackets can be one, two, and three-dimensional waves. In addition they tend to self-heal themselves which is important in adverse environments.

A fifth objective of the invention is to provide methods, apparatus and systems for Airy waves and wavepackets that can be used to effectively direct a wave on targets in a diffraction-free manner while allowing the main lobe of this wavepacket to self-bend during propagation.

A sixth objective of the invention is to provide methods, apparatus and systems for Airy waves and wavepackets that can be used to overcome pulse-brodening effects because of dispersion. The self-bending character of these beams can be utilized in military LIDAR, microwave and ultrasonic applications for imaging purposes.

A seventh objective of the invention is to provide methods, apparatus and systems for generating diffraction free Airy waves and wavepackets for application including optics, acoustics, microwaves, in particle manipulation and detection, biology, cold atom optics, and in material processing.

An eighth objective of the invention is to provide methods, apparatus and systems for Airy waves and wavepackets that can be used in near-field microscopy, in ablation of organic and inorganic materials, and in trapping and transoprting micro and nano-particles in liquids and aerosols. Given that Airy beams or pulses are self-healing, these waves can be used in adverse environments such as those in the presence of atmospheric turbulence etc.

A first embodiment provides a method for generating Airy waves and Airy wavepackets by generating an input beam or an input pulse and passing the input beam or input pulse through a transformation arrangement to produce an Airy pattern output. The input beam generation includes generating an input wave selected from the group consisting of a un-chirped broad input wave, a broad optical input wave, a broad electromagnetic input wave and a broad acoustical input wave. The a transformation step includes passing the input wave through a phase mask then Fourier transforming the output wave into an Airy wave in the spatial domain, passing the input wave through a spatial light modulator then Fourier transforming the output into an Airy wave in the spatial domain; filtering the input wave then Fourier transforming the filtered wave into an Airy pattern output in the spatial domain; and filtering the input beam through an amplitude-phase filter in the spatial domain to produce a corresponding one of an electromagnetic, optical, and acoustic Airy beam.

Alternatively, the transformation includes imposing a cubic spectral phase on the input pulse to generate Airy pulses in a time domain; using a phase mask to impose a cubic phase on the input pulse to generate Airy pulses in a frequency domain using a spatial light modulator to impose a cubic phase on the input pulse to generate Airy pulses in a frequency domain; passing the input pulse through an optical fiber with appreciable cubic dispersion and zero quadratic dispersion to generate Airy pulses in a frequency domain or passing the input beam through an optical system to generate the Airy pattern output.

A second embodiment provides an Airy beam generation including an input pulse or beam source and a Fourier transformation apparatus to transform the input pulse through Fourier synthesis into an Airy pattern output. The input beam or wave source is selected from a group consisting of an electromagnetic source acoustical source and an optical source to generate a corresponding one of an input electromagnetic, acoustical or optical pulse or beam.

The Fourier transformation apparatus in the spatial domain can includes a phase mask for receiving the input beam or pulse and generating a corresponding output beam or pulse and a Fourier transform device to Fourier transform the output beam or pulse into an Airy wave; an amplitude and phase filter to Fourier transform the input beam into an Airy wave and a spatial light modulator to Fourier transform the input beam into an Airy wave; a filtering system to Fourier transform the input beam into an Airy.

The Fourier transformation apparatus can be an amplitude and phase filter to Fourier transform one of the input electromagnetic or acoustical input beam into an Airy pattern output in one of a frequency domain, a time domain; a cubic spectral phase device to impose a cubic spectral phase on the input pulse to generate Airy pulses in a time domain; or a phase mask to impose a cubic phase on the input pulse to generate Airy pulses in a frequency domain. Or the Fourier transformation apparatus can be an optical fiber with appreciable cubic dispersion and zero quadratic dispersion or an optical system to generate the Airy pattern output Further objects and advantages of this invention will be apparent from the following detailed description of preferred embodiments which are illustrated schematically in the accompanying drawings.

BRIEF DESCRIPTION OF THE FIGURES

FIG. 1b is a graph showing the square of the Airy function shown in FIG. 1a.

FIG. 2a shows ballistic dynamics of an ideal Airy beam (a=0) when v=−2.

FIG. 2b shows ballistic dynamics of an ideal Airy beam (a=0) when v+0.

FIG. 2c shows ballistic dynamics of an ideal Airy beam (a=0) when v=+2.

DESCRIPTION OF THE PREFERRED EMBODIMENTS

Figure 1B:
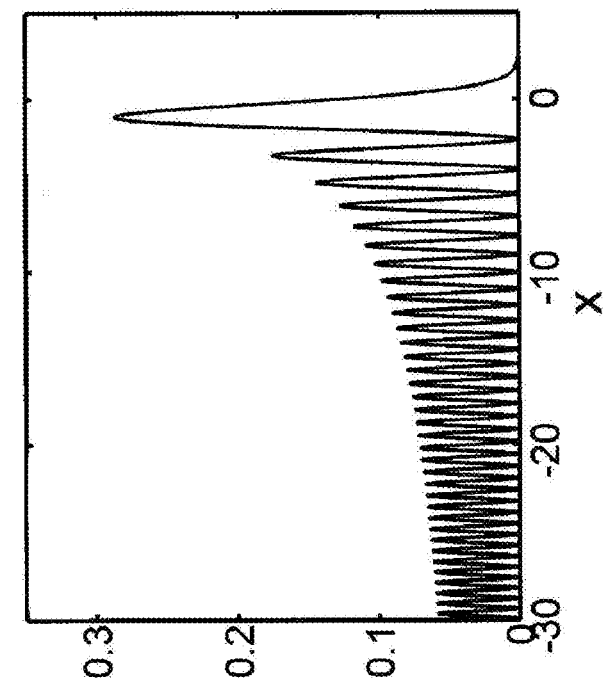

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of the reference numbers used in the drawings and the detailed specification to identify components:

| | | | |
|---|---|---|---|
| 100 | experimental set-up | 110 | laser |
| 120 | beam splitter | 910 | input wave |
| 130 | lens | 920 | cubic phase |
| 140 | mirror | 925 | Fourier transform device |
| 150 | beam expander | 930 | Airy wave |
| 160 | spatial light modulator | 1010 | input beam |
| 170 | controller | 1020 | amp-phase filter |
| 180 | MO | 1030 | Airy pattern output |
| 190 | camera | 1110 | input pulse |
| 810 | input beam | 1020 | cubic spectral phase |
| 860 | airy pattern output | 1130 | Airy pulse output |

The present invention provides methods and systems to generate Airy waves and provides examples of their possible applications using unique and remarkable properties of a newly invented class of waves—the so called Airy wavepackets. Airy waves can be generated and used in several fields of interest involving waves such as in optics, acoustics, microwaves, in particle manipulation and detection, biology, cold atom optics, and in material processing. These wavepackets can propagate over relatively long distances without any appreciable broadening and or spreading-effects that are typically undesirable in many applications.

As a result, for all practical purposes, they are diffraction or dispersion free. Even more importantly, these waves freely self-bend or accelerate during propagation. In other words their intensity features tend to move along parabolic trajectories pretty much like those of a canon ball moving under the action of gravity. Depending on their initial launch angle, these waves or beams can move along curved trajectories with a predetermined radius of curvature. The present invention provides methods and techniques to synthesize Airy wavepackets in both the spatial and temporal domain.

Figure 1A:
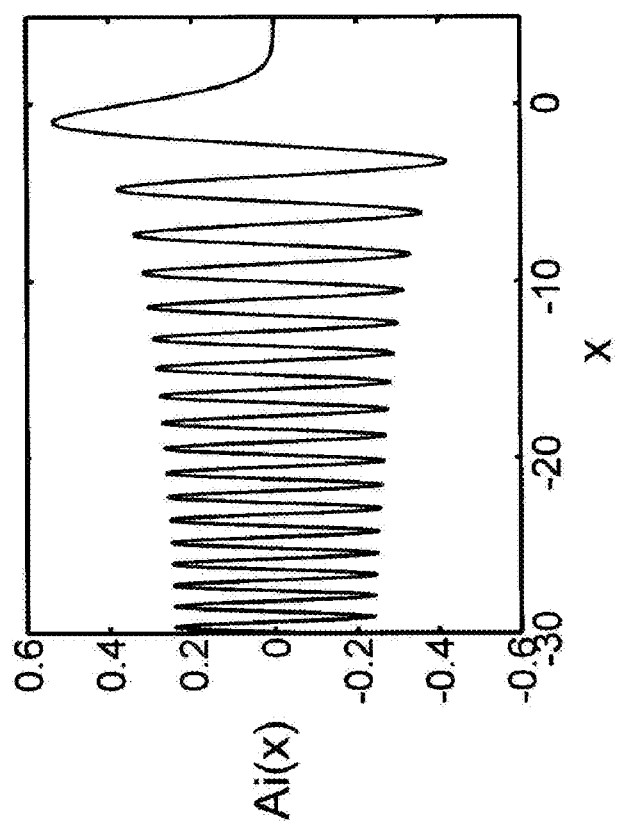
FIG. 1a is a graph showing an Airy function Ai(x).

An Airy wave closely follows the mathematical Airy function Ai(x). FIGS. 1a and 1b show the function Ai(x) and its square or intensity ($Ai^2(x)$), respectively. To analyze the ballistics of optical Airy beams, the normalized paraxial equation of diffraction is used:

$$i\frac{\partial \phi}{\partial \xi} + \frac{1}{2}\left(\frac{\partial^2 \phi}{\partial s^2} + \frac{\partial^2 \phi}{\partial \eta^2}\right) = 0 \quad (1)$$

where $\phi$ is the electric field envelope, $k=2\pi n/\lambda_0$ is the wavenumber of the optical wave, $s=x/x_0$ and $\eta=y/x_0$ represent dimensionless transverse coordinates, $x_0$ is an arbitrary transverse scale, and $\xi=z/kx_0^2$ is a normalized propagation distance. Starting from Equation (1), the acceleration dynamics of one-dimensional Airy beam solutions have been recently discussed in Siviloglou and Christodoulides, "Accelerating finite energy Airy beams," Opt. Lett. 32, 979-981 (2007); Broky, Siviloglou, Dogariu and Christodoulides, "Observation of Accelerating Airy Beams", Frontiers in Optics (FiO) 2007 paper: PDP-B3; Siviloglou, Broky, Dogariu, and Christodoulides, Phys. Rev. Lett. 99, 213901 (2007); and Siviloglou, Broky, Dogariu, and Christodoulides, "Ballistic dynamics of Airy beams," Opt. Lett. 33, 207-209 (2008) which are incorporated herein by reference.

In order to investigate the trajectories of Airy waves, the co-inventors considered the input field distribution $\phi(s, \xi=0) = Ai(s)\exp(as)\exp(ivs)$, where Ai(s) represents the Airy function, a in the exponential truncation factor is a small positive parameter, and v is associated with the initial launch angle (or "velocity") of this beam. Under these initial conditions and from Equation (1), it was determined that this finite energy Airy wave evolves according to:

$$\phi(\xi, s) = Ai[s - (\xi/2)^2 - v\xi + ia\xi]\exp[as - (a\xi^2/2) - av\xi] \times \exp[i(-(\xi^3/12) + ((a^2 - v^2 + s)\xi/2) + vs - (v\xi^2/2))] \quad (2)$$

Higher dimensional Airy waves can be similarly generated using separation of variables. From the argument of the one-dimensional Airy function in Equation (2) it can be concluded that this beam follows a ballistic trajectory in the s-$\xi$ plane which is described by the parabola $s = v\xi + (\xi/2)^2$. In physical units, this parabolic deflection of the beam intensity features is given by $x_d = \theta z + (z^2/(4k^2 x_0^3))$ where the actual launch angle $\theta$ in the x-z coordinates is related to the normalized v parameter through $\theta = v/(kx_0)$.

In this example, the corresponding Newtonian (kinematical) equations describing this ballistics are $d^2x/dz^2 = 1/(2k^2 x_0^3) = g$ and $dx/dz = gz + \theta$ where g plays the role of "gravity". The propagation dynamics of exponentially truncated Airy beams are shown in FIG. 1 under different launch conditions. As clearly illustrated in FIGS. 2a, 2b and 2c, these correspond to three distinct regimes. More specifically, when this wave is launched upwards when the launch angle is negative v<0, the beam initially ascends until it stalls due to downward acceleration at $\hat{z} = -\theta/g = -2k^2 x_0^3 \theta$. At this apogee point the maximum deflection is $x_{d\,max} = -\theta^2 k^2 x_0^3$. From that point on, the packet accelerates downwards as shown in FIG. 2a. In fact, this ballistic behavior suggests that the Airy wavepacket can circumvent a solid object O depicted schematically in FIG. 1a lying straight in its path, by following instead a curved trajectory. If on the other hand the launch angle is zero, the wave follows a parabolic trajectory as shown in FIG. 2b, similar to that predicted and demonstrated in Refs. Siviloglou (Opt. Lett. 2007), Broky (Frontiers in Optics 2007) and Siviloglou (Phys. Rev. Lett 2007). The example where v>0 is shown in FIG. 1c.

Figure 3:
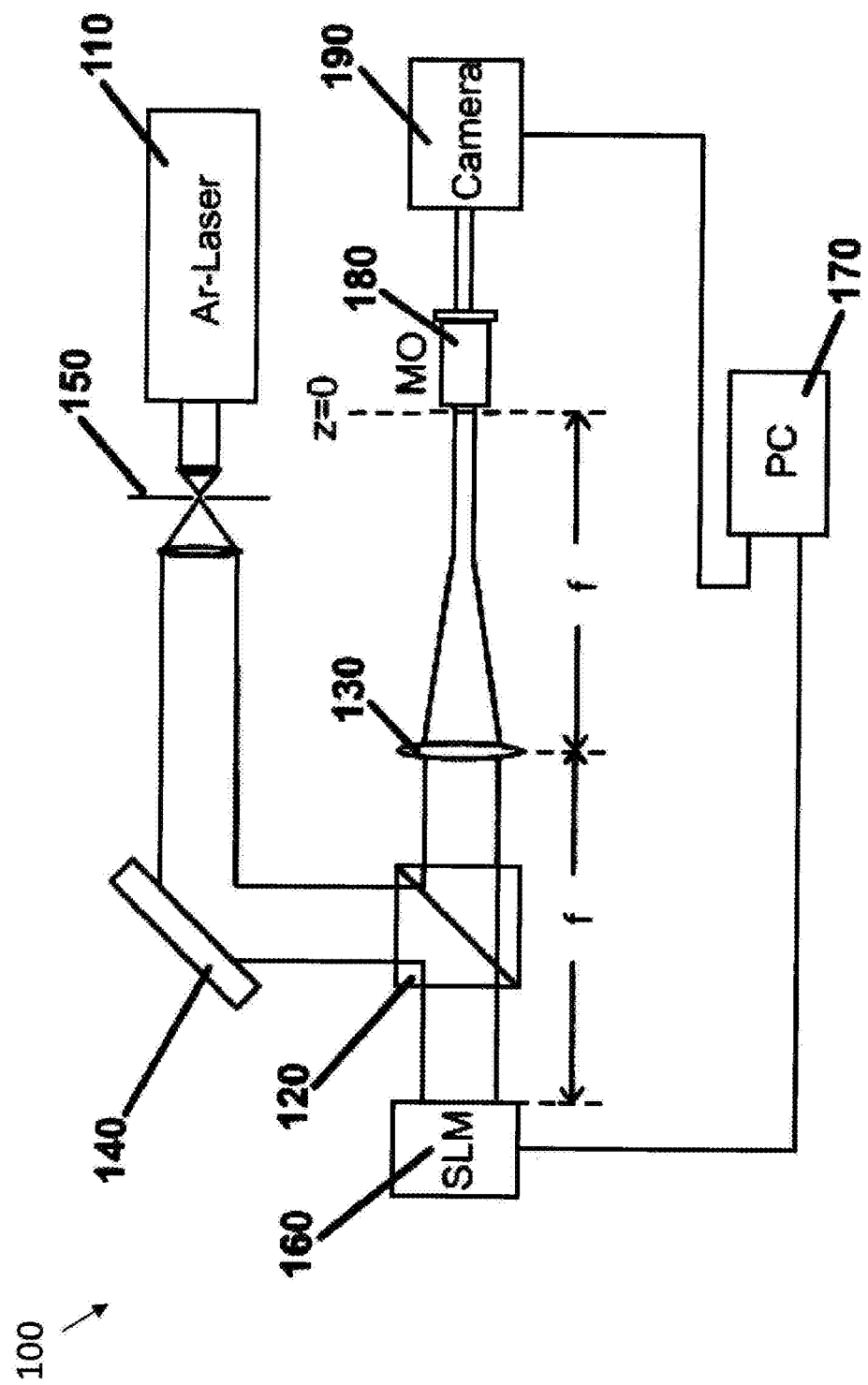
FIG. 3 is a block diagram showing an experimental set-up for generating Airy waves according to the present invention.
Figure 4:
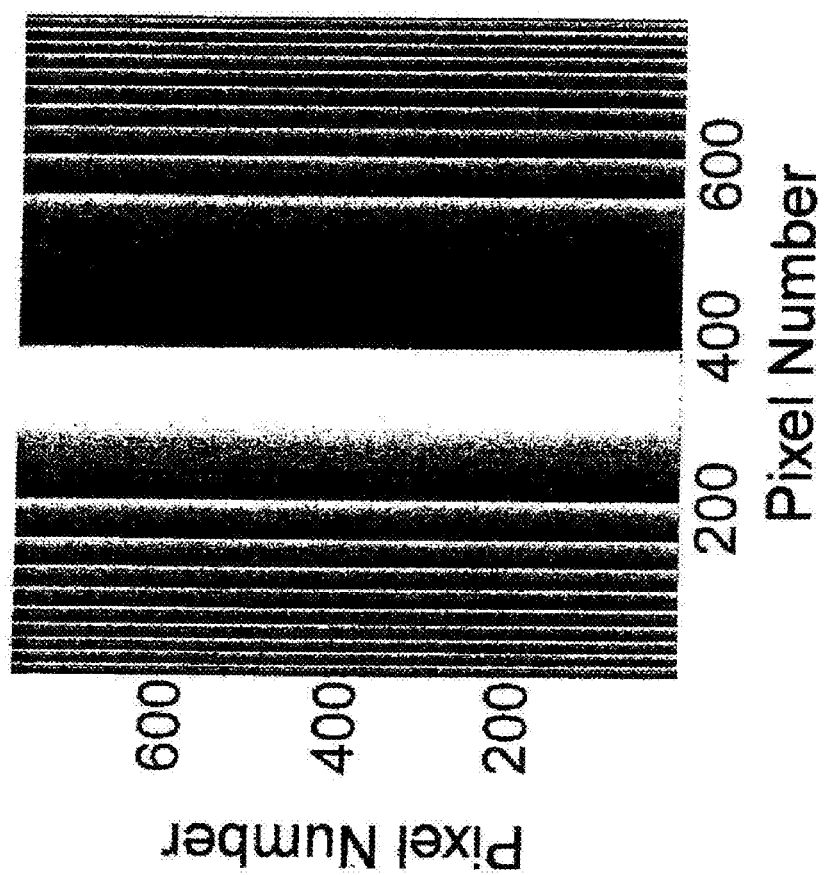
FIG. 4 shows an example of a cubic phase modulo $2\pi$ mask that can be used to generate one-dimensional Airy beams.

The experimental set-up 100 used to observe the ballistic dynamics of finite energy Airy wavepackets is shown in FIG. 3. As in Siviloglou (Phys. Rev. Lett 2007) and. Siviloglou (Opt. Lett. 2008), the Airy wavefront Ai(s) exp(as) is generated by imposing on the phase of a broad Gaussian beam a cubic modulation. The cubic phase was obtained from the front facet of a computer-controlled Hamamatsu X8267 parallel aligned nematic liquid crystal spatial light modulator 160 (SLM). The Gaussian beam was obtained from a linearly polarized Argon-ion continuous-wave laser 110 operating at 488 nm. This beam was then collimated by a beam expander 150 at a FWHM of approximately 6.7 mm. The expanded beam is reflected by mirror 140 to beamsplitter 120. In order to generate the one-dimensional Airy wavepacket, a converging cylindrical lens 130 with f=1.2 m was placed at a distance f in front of the spatial light modulator 160 phase array. The propagation dynamics of these beams were then recorded with a camera 190 as a function of propagation distance by translating the imaging apparatus. The origin z=0 is taken at a distance f after the cylindrical lens 130, e.g. at the point where the exponentially truncated Airy function is Fourier generated. The launch angle was controlled by varying the transverse displacement of the imaging lens 130 with respect to the axis of the system. This operation is equivalent to the shifting property of Fourier transforms. The cubic phase mask used to produce this Airy beam in this example, as shown in FIG. 4, is a cubic phase modulo $2\pi$ mask.

Figure 5A:
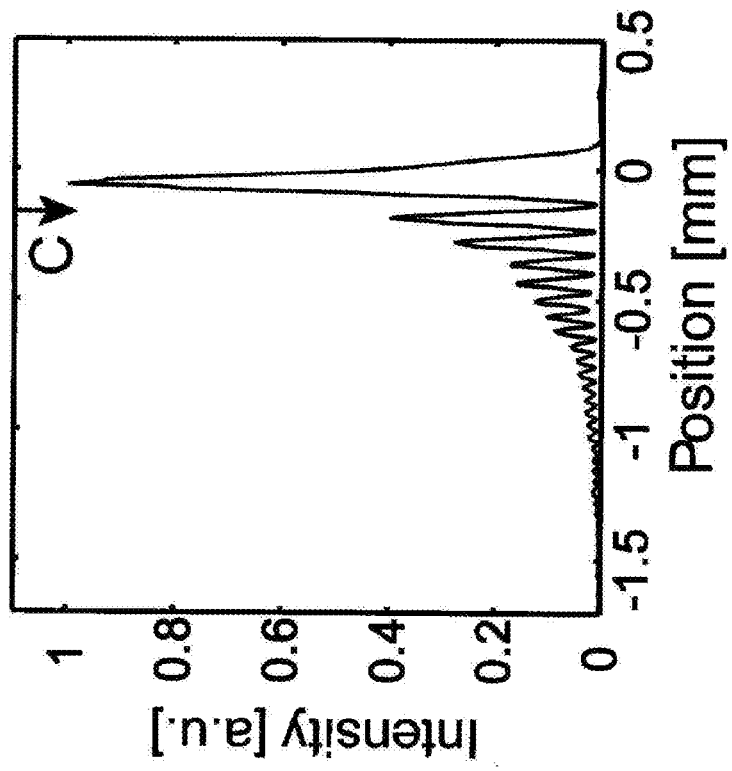
FIG. 5a shows the experimental input intensity profile of the Airy beam used for a variety of launching angles.
Figure 5B:
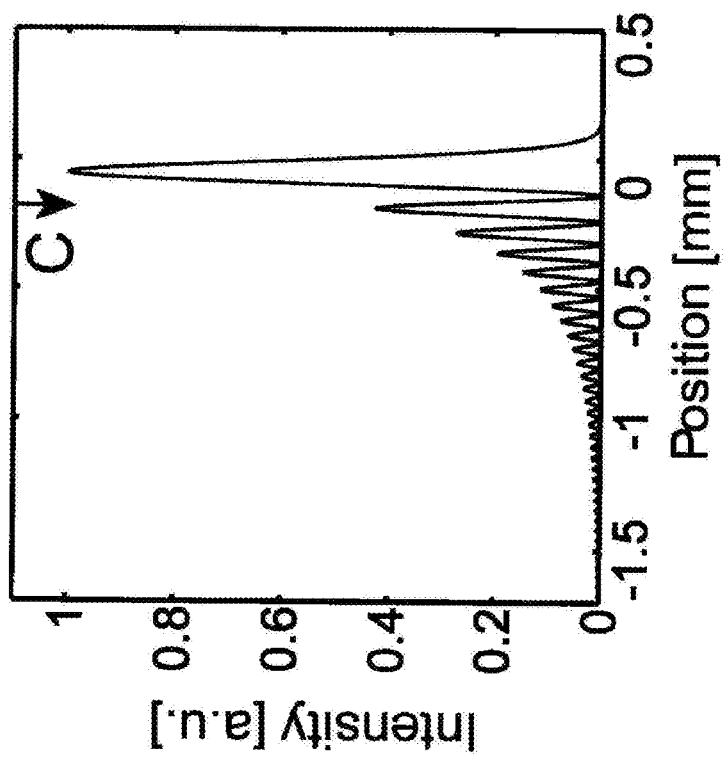
FIG. 5b shows the theoretical input intensity profile of the Airy beam when $x_0$=59 µm and $\alpha$=0.08.

FIG. 5a shows the input intensity profile of the Airy beam produced at z=0, as used for all launching angles in the experiment. FIG. 5b on the other hand depicts the corresponding best-fitted theoretical intensity cross-section of this wave when $x_0$=approximately 59 µm and an aperture parameter of a approximately 0.08. In the experiment, the best fit was obtained for $x_0$=59 µm and for an aperture parameter a=0.08.

Figure 6:
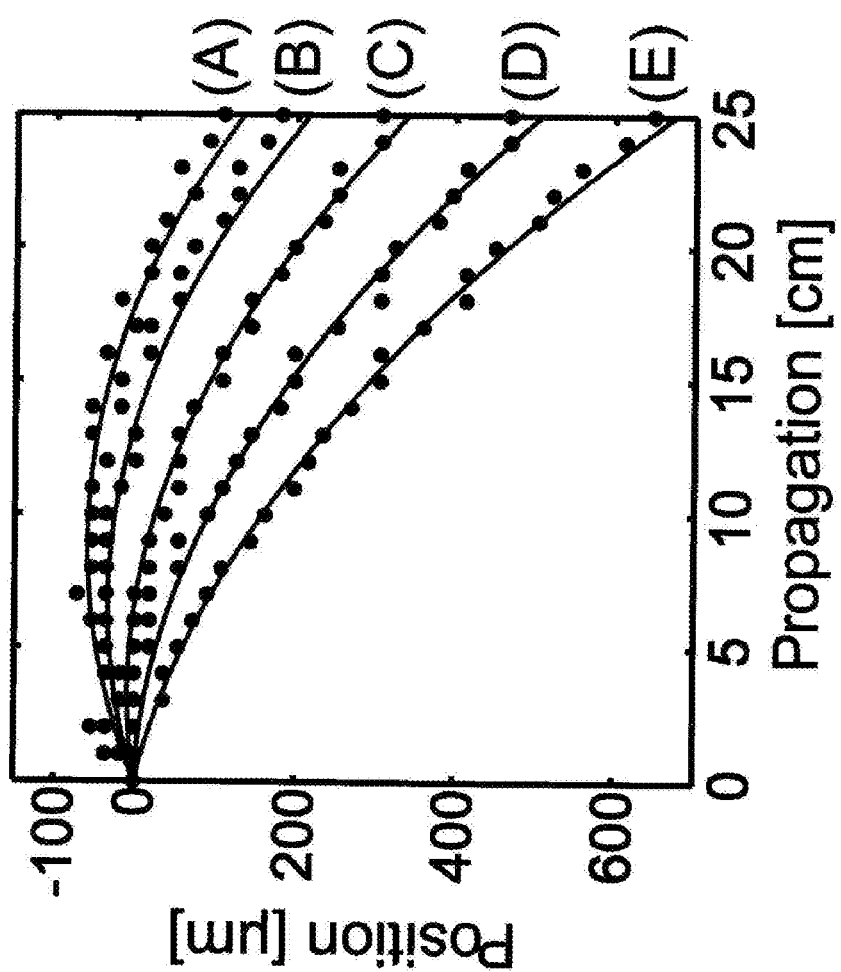
FIG. 6 is a graph showing Airy beam ballistics.

The ballistic dynamics of these exponentially truncated Airy beams are shown in FIG. 6 for various launch angles. The parabolic trajectories of the intensity features of these beams were monitored up to a distance of approximately 25 cm and the wavefront tilt angle varied from approximately −1.33 to approximately 0.83 milliards in order to realize the three ballistic regimes discussed above. The curves shown as A, B, C, D and E in FIG. 6 were obtained for (A) $\theta$=−1.33, (B) $\theta$=−1.0, (B) $\theta$=−0.5, (D) $\theta$=+0.17 and (E) $\theta$=+0.83 mrad. As shown in FIG. 6, for a lunch angle of (A) $\theta$=−1.33 mrad, the Airy beam reaches its apogee at $\hat{z}$=−2$k^2 x_0^3 \theta$=9 cm, at which point the beam deflection is, $x_{d\,max}$=−$\theta^2 k^2 x_0^3$=−60 µm, in excellent agreement with predictions. Curve D in FIG. 6 corresponds to a zero launch angle and its parabolic trajectory is similar to that reported in Siviloglou (Phys. Rev. Lett 2007). On the other hand, curve E in FIG. 6, is obtained for $\theta$=0.83 mrad. For this latter scenario, the acceleration displacement is further enhanced because of downward motion. The solid lines for each curve in FIG. 6 correspond to the theoretical curves associated with these cases while the dots plot the experimental results.

Figure 7A:
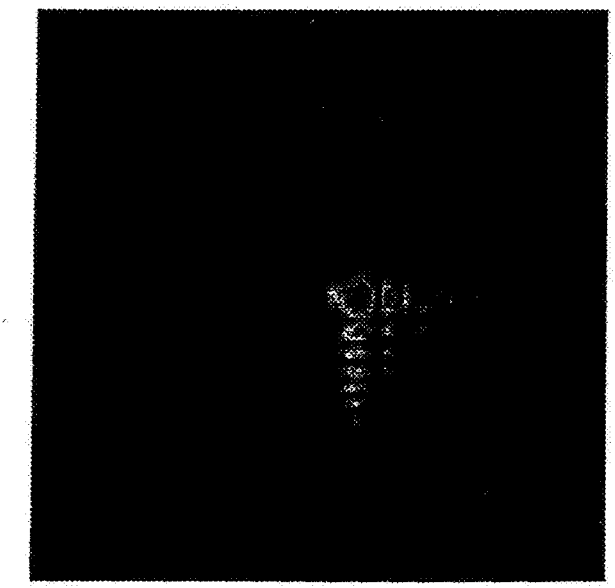
FIG. 7a shows the intensity profile cross-section of a two-dimension Airy beam.
Figure 7B:
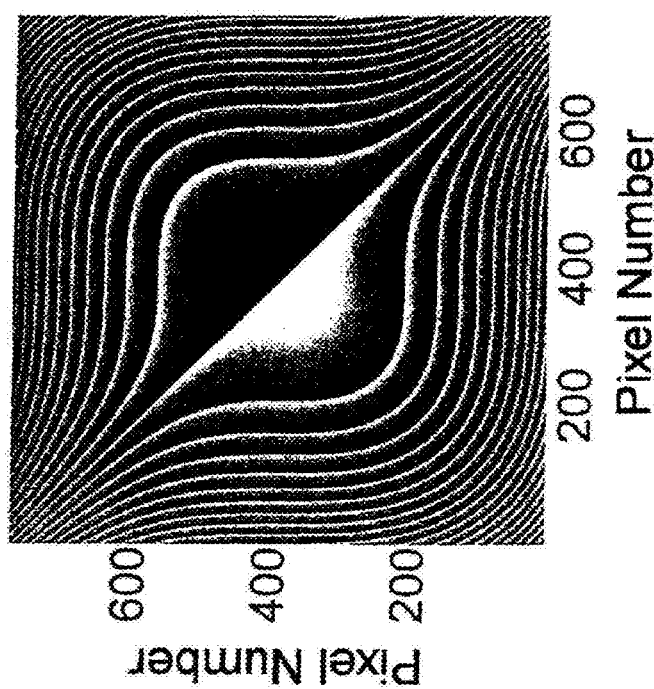
FIG. 7b shows the corresponding two-dimensional modulo $2\pi$ phase mask.

Similarly two-dimensional Airy beams can be generated of the form: $\phi(x, y, z=0) = Ai(x/x_0)Ai(y/y_0)\exp(x/W_1)\exp(y/W_2)$ can be synthesized using two-dimensional phase masks. The intensity profile cross-section of a two-dimensional Airy beam is shown in FIG. 7a and the corresponding two-dimensional modulo $2\pi$ phase mask that was used is shown in FIG. 7b.

The present invention provides methods to generate Airy beams in the electromagnetic domain with special emphasis on their optical implementation. Techniques to generate Airy waves using acoustical waves are also considered. While the methods are described for acoustical waves, those skilled in the art will appreciate that the methods can be readily applied to any other coherent wave in nature.

Figure 8:
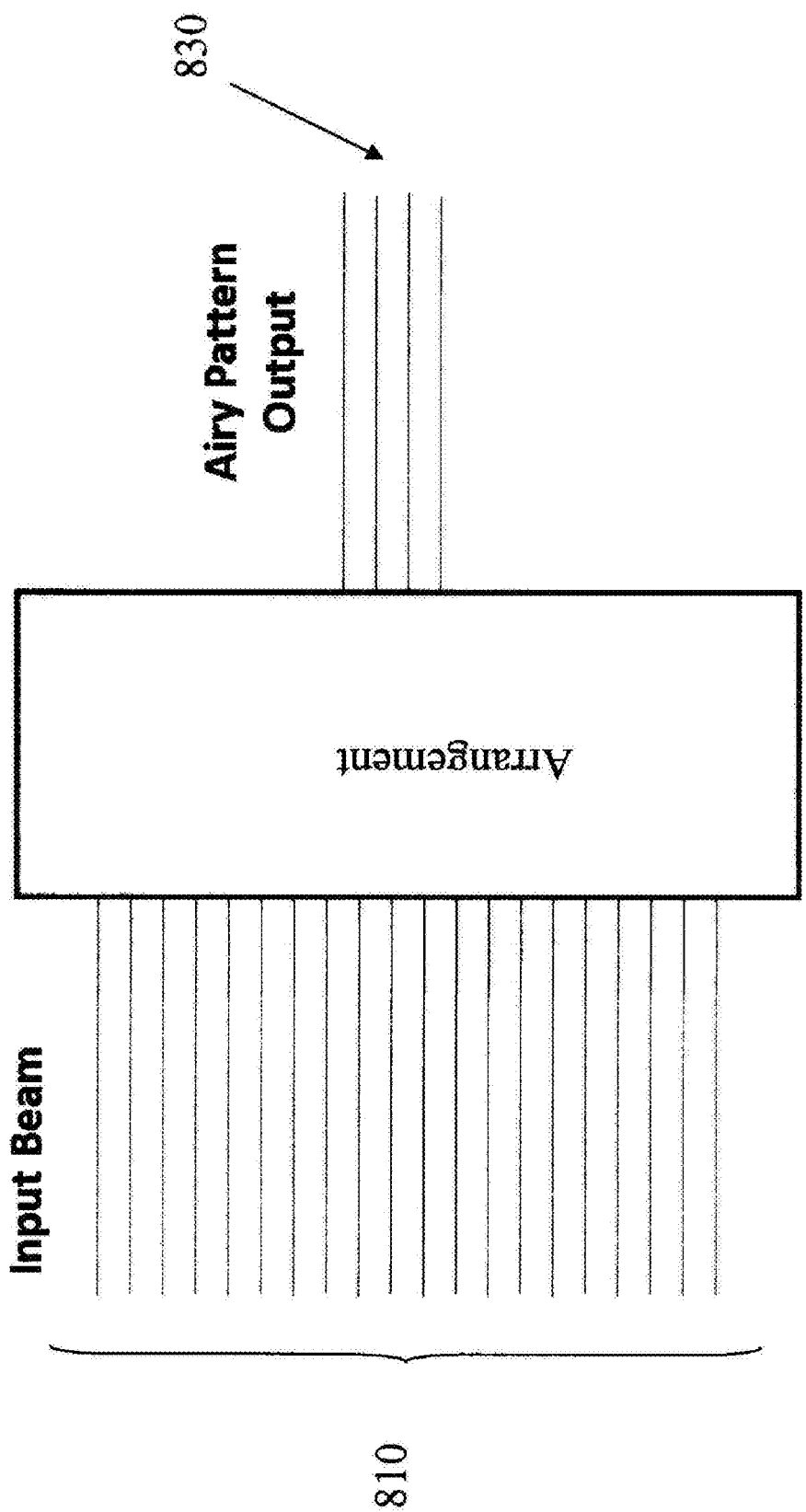
FIG. 8 is a block diagram of a general arrangement for producing an Airy wave.

FIG. 8 shows an example of a general Arrangement through which an Airy pattern output 830, including an Airy beam or temporal wavepacket, can be produced at the output from an input beam 820. Airy wavefronts and wavepackets can be generated using Airy beam generation through Fourier synthesis using phase masks or filters in the spatial domain; Airy beam generation using amplitude and phase filters in the spatial domain; and Airy pulse generation through Fourier synthesis using phase and/or amplitude filters in the temporal frequency domain. The following paragraphs disclose specific examples of arrangements.

Figure 9:
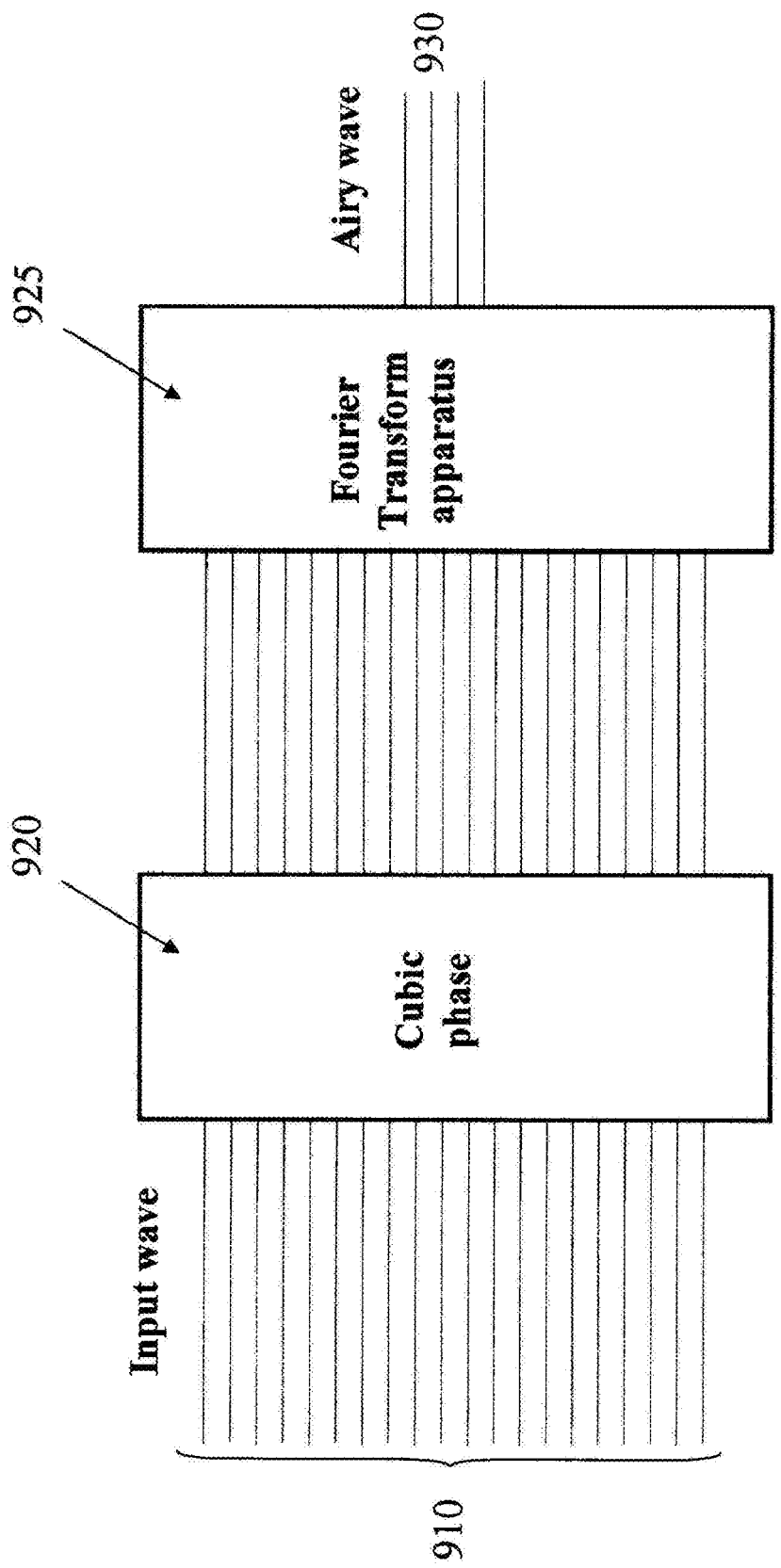
FIG. 9 shows Airy beam generation through Fourier synthesis using phase masks or filters in the spatial domain.

FIG. 9 shows an example of a general configuration that can generate an Airy wave 930 from an input wave 910 using beam generation through Fourier synthesis 925 using phase masks or filters 920 in the spatial domain. A broad optical, electromagnetic or acoustical beam 910 goes through a cubic phase mask 920 and it is then Fourier transformed 925 to generate Airy waves at the output 930. If the broad beam is Gaussian, this leads to the Airy beam discussed in Siviloglou (Phys. Rev. Lett. 2007) and Siviloglou (Opt. Lett. 2008). If the broad beam approaches a plane wave, this leads to the Airy beam as shown in FIG. 1a. Other Airy-like beams are also possible using an un-chirped broad input wave.

In optics, Fourier transformations can be realized using standard lenses and the cubic phase can be imposed either in transmission or reflection mode. For example, these cubic phase masks can be implemented using spatial light modulators, phase-masks fabricated using e-beam lithography or etching. Those skilled in the art will understand that alternative implementations can be substituted for Fourier transformations.

Figure 10:
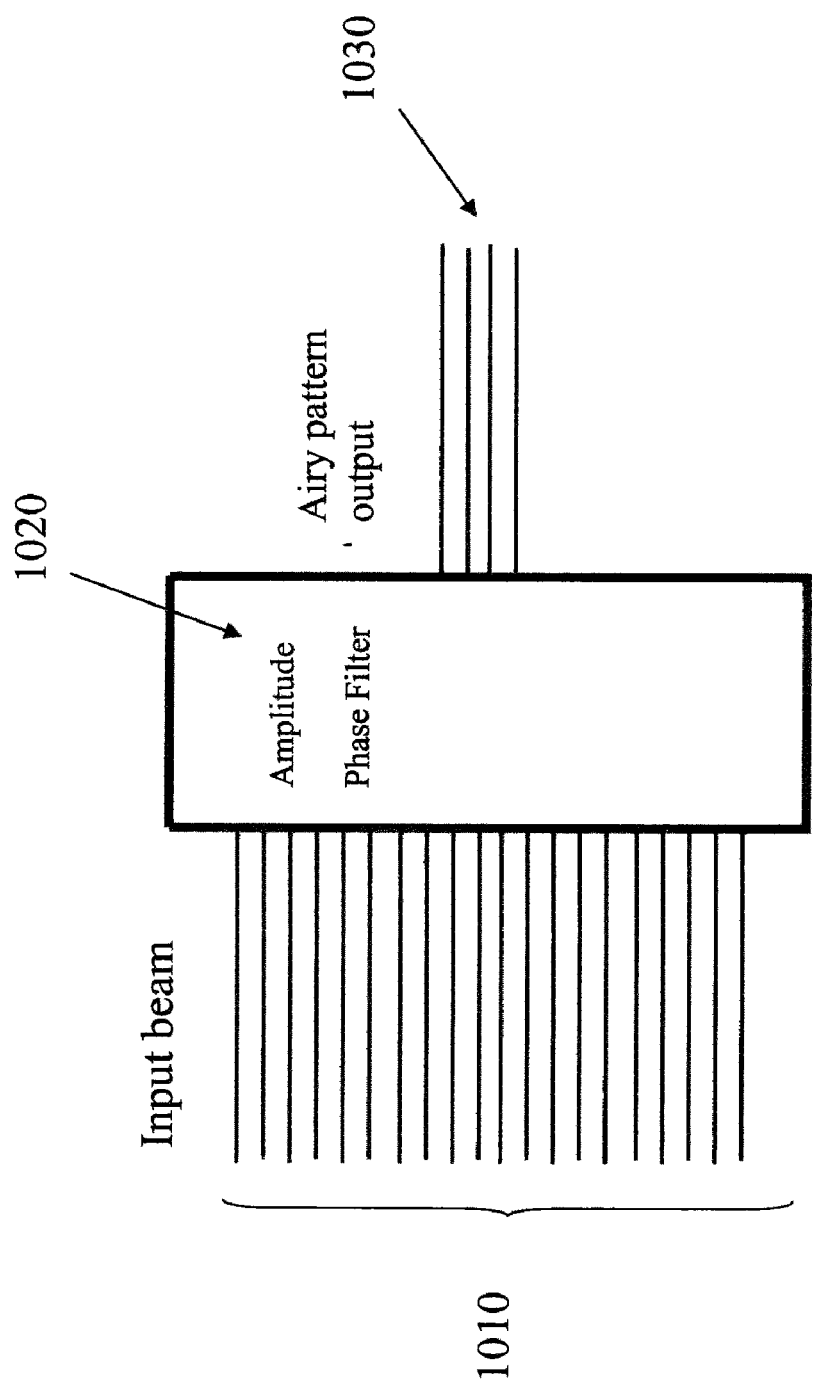
FIG. 10 shows Airy beam generation using an amplitude-phase filter.
Figure 11:
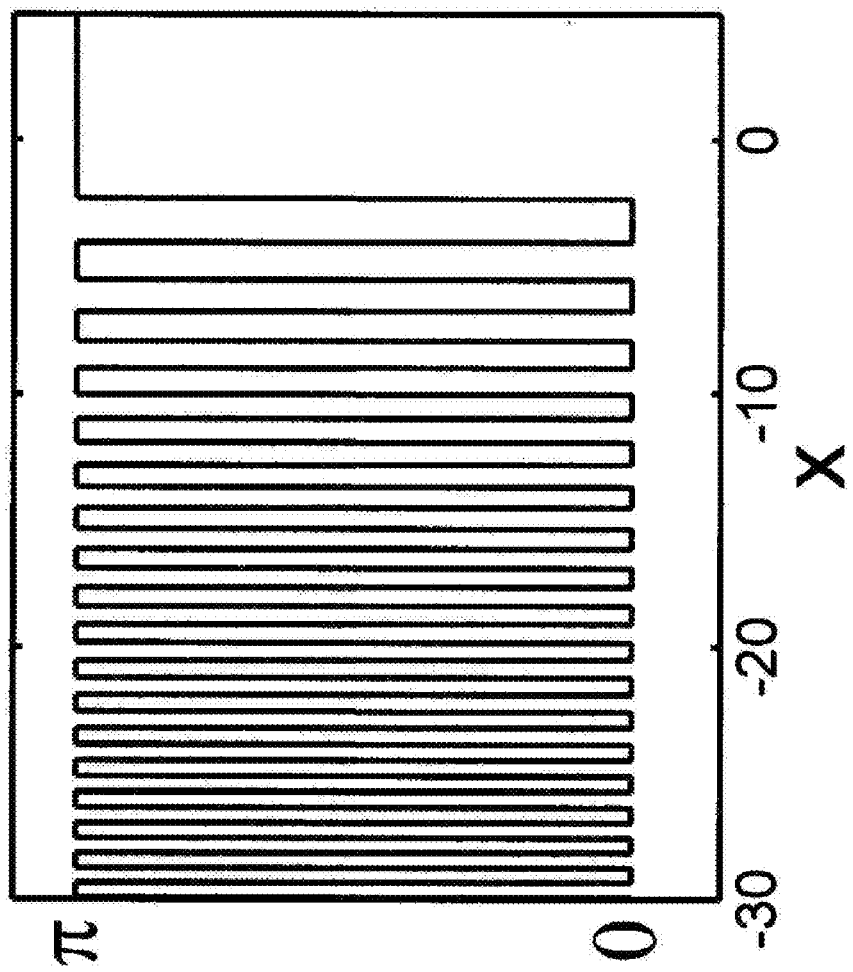
FIG. 11 is a graph showing the phase function of an amplitude-phase filter for generating an Airy wave.

Another arrangement that can be used to generate Airy beams 1030 is based on amplitude-phase filters 1020 from an input beam 1010 in the spatial domain is shown schematically in FIG. 10. In particular, the same filter or a sequence of filters 1020 can be used to impose on a broader beam an amplitude and phase so that the output wave 1030 matches the Airy profile similar to that shown in FIG. 1a. The power transmission of this amplitude approximately matches FIG. 1b while the phase modulation is approximately as shown in FIG. 11.

Figure 12:
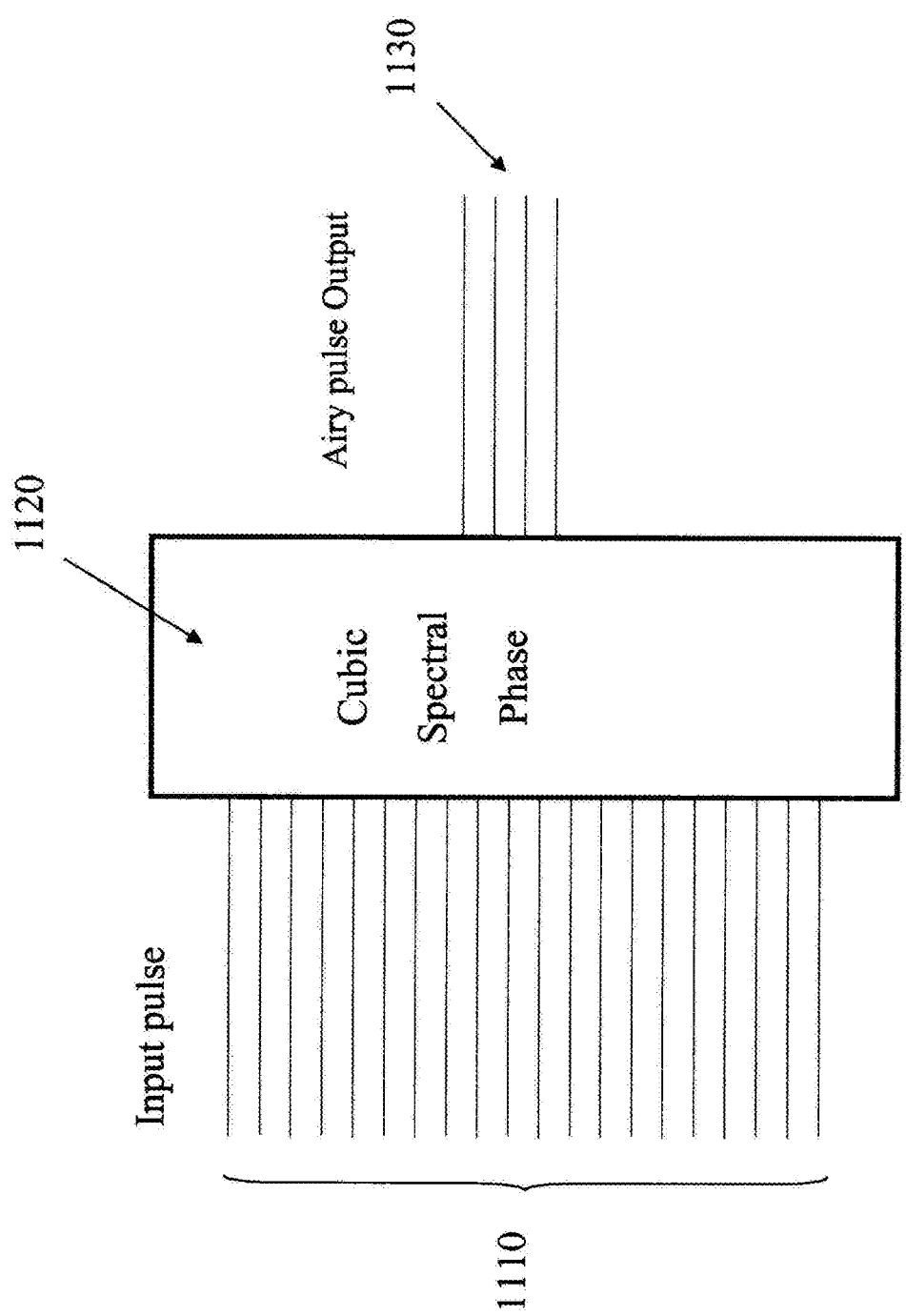
FIG. 12 shows an arrangement to generate Airy pulses using cubic spectral phase according to the present invention.
Figure 13:
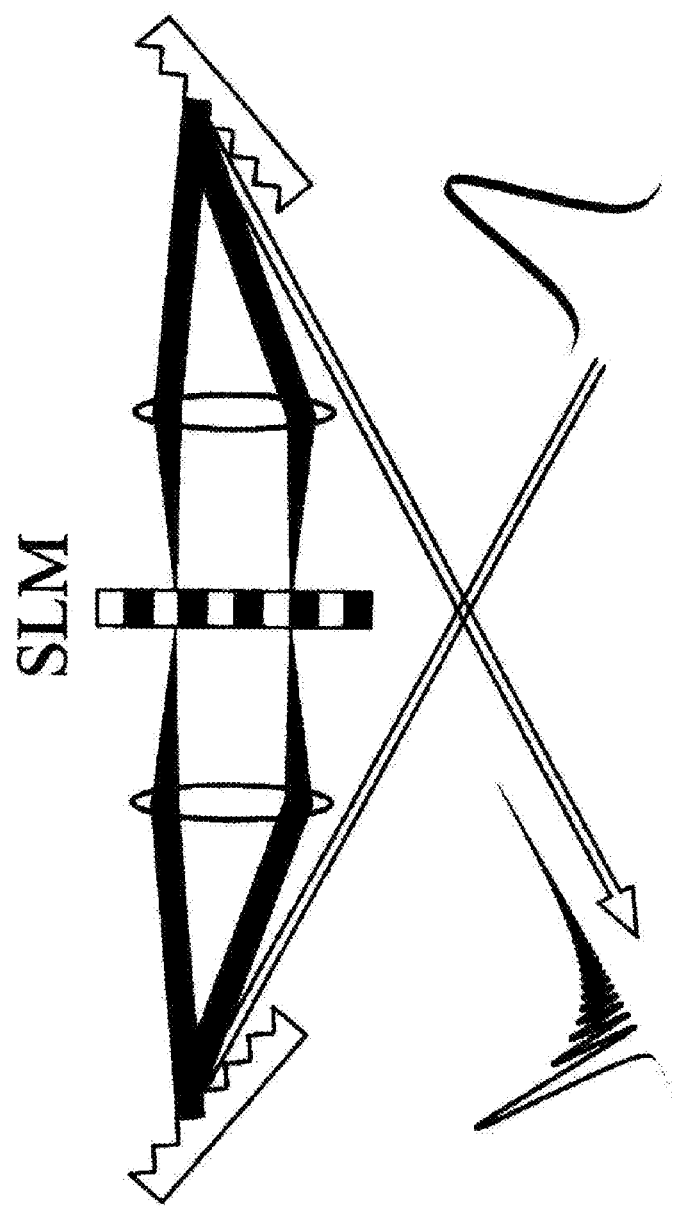
FIG. 13 shows an example of a configuration for producing Airy pulses using a cubic spectral phase.

The arrangement shown in FIG. 10 can be used to generate, electromagnetic, optical, and acoustic Airy beams 1030. For example this configuration can be used under uniform illumination (for the input wave 1010) followed by amplitude and phase masks 1020. FIG. 12 shows an arrangement to generate Airy pulses 1230 in the time domain. A cubic phase is imposed in the frequency domain. The cubic phase in the frequency domain can be imposed using a phase mask 1310 as shown in FIG. 13 or by passing a pulse through an optical fiber with appreciable cubic dispersion and zero quadratic dispersion.

These Airy waves can be frequency-synthesized by taking advantage of the fact that their Fourier spectrum possesses a purely cubic phase. The generated Airy patterns and pulses can be implemented and used in diverse areas of technology ranging from optics to microwaves, from acoustics to coherent matter waves. Both low and high power applications are anticipated. The self-bending character of these beams can be utilized in military LIDAR, microwave and ultrasonic applications for imaging purposes. In addition they can be used in near-field microscopy, in ablation of organic and inorganic materials, and in trapping and transoprting micro and nanoparticles in liquids and aerosols. Given that Airy beams or pulses are self-healing, these waves can be used in adverse environments such as those in the presence of atmospheric turbulence etc. Another possibility is to use self-bending Airy waves to wite bent waveguides in the bulk of materials using nonlinear optical processes. Finally the use of parabolically bent waves in tomograpjy has also been recently suggested.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method for generating Airy waves and Airy wavepackets comprising the steps of:
    generating an input beam or an input pulse;
    passing the input beam or input pulse through a one of a phase mask, a spatial light modulator, and a filter to produce an output wave; and Fourier transforming the output wave into an Airy wave in the spatial domain.

2. The method of claim 1 wherein the input beam generation step comprises the step of:
    generating an input wave selected from the group consisting of a un-chirped broad input wave, a broad optical input wave, a broad electromagnetic input wave and a broad acoustical input wave.

3. The method of claim 1 wherein the airy pattern output is one of a one-dimensional, two-dimensional or three dimensional.

4. The method of claim 2 wherein the input wave is a broad optical wave and a lens is used for the Fourier transformation.

5. The method of claim 2, wherein the passing step comprises the step of:
    filtering the input beam through an amplitude-phase filter in the spatial domain to produce a corresponding one of an electromagnetic, optical, and acoustic Airy beam.

6. The method of claim 1, wherein the passing step comprises the step of:
    imposing a cubic spectral phase on the input pulse to generate Airy pulses in a time domain.

7. The method of claim 1, wherein the passing step comprises the step of:
    using a phase mask to impose a cubic phase on the input pulse to generate Airy pulses in a frequency domain.

8. The method of claim 1, wherein the passing step comprises the step of:
    using a spatial light modulator to impose a cubic phase on the input pulse to generate Airy pulses in a frequency domain.

9. The method of claim 1, wherein the passing step comprises the step of:
    passing the input pulse through an optical fiber with appreciable cubic dispersion and zero quadratic dispersion to generate Airy pulses in a frequency domain.

10. The method of claim 1, wherein the step of passing comprises the steps of:
    passing the input beam through an optical system to generate the Airy pattern output.

11. An Airy beam generation apparatus comprising:
    an input pulse or beam source; passing the input pulse through one of a phase mask, a spatial light modulator, and a filter, to produce an output wave; and
    a Fourier transformation apparatus to transform the input pulse through Fourier synthesis into an Airy pattern output.

12. The apparatus of claim 11 wherein the input beam or wave source is selected from a group consisting of an electromagnetic source acoustical source and an optical source to generate a corresponding one of an input electromagnetic, acoustical or optical pulse or beam.

13. The apparatus of claim 12 wherein the Fourier transformation apparatus comprises:
    an amplitude and phase filter to Fourier transform one of the input electromagnetic or acoustical input beam into an Airy pattern output in one of a frequency domain and a time domain.

14. The apparatus of claim 11 wherein the Fourier transformation apparatus comprises:

an amplitude and phase filter to Fourier transform the input beam into an Airy wave in a spatial domain.

15. The apparatus of claim 11 wherein the Fourier transformation apparatus comprises:
a cubic spectral phase device to impose a cubic spectral phase on the input pulse to generate Airy pulses in a time domain.

16. The apparatus of claim 11 wherein the Fourier transformation apparatus comprises:

a phase mask to impose a cubic phase on the input pulse to generate Airy pulses in a frequency domain.

17. The apparatus of claim 12 wherein the Fourier transformation apparatus is an optical fiber with appreciable cubic dispersion and zero quadratic dispersion.

18. The apparatus of claim 12 wherein the Fourier transformation apparatus is an optical system to generate the Airy pattern output.

* * * * *